April 29, 1924.
A. Z. JOHNSON ET AL
1,492,173
APPARATUS FOR BUTT WELDING TUBING
Filed April 6, 1922
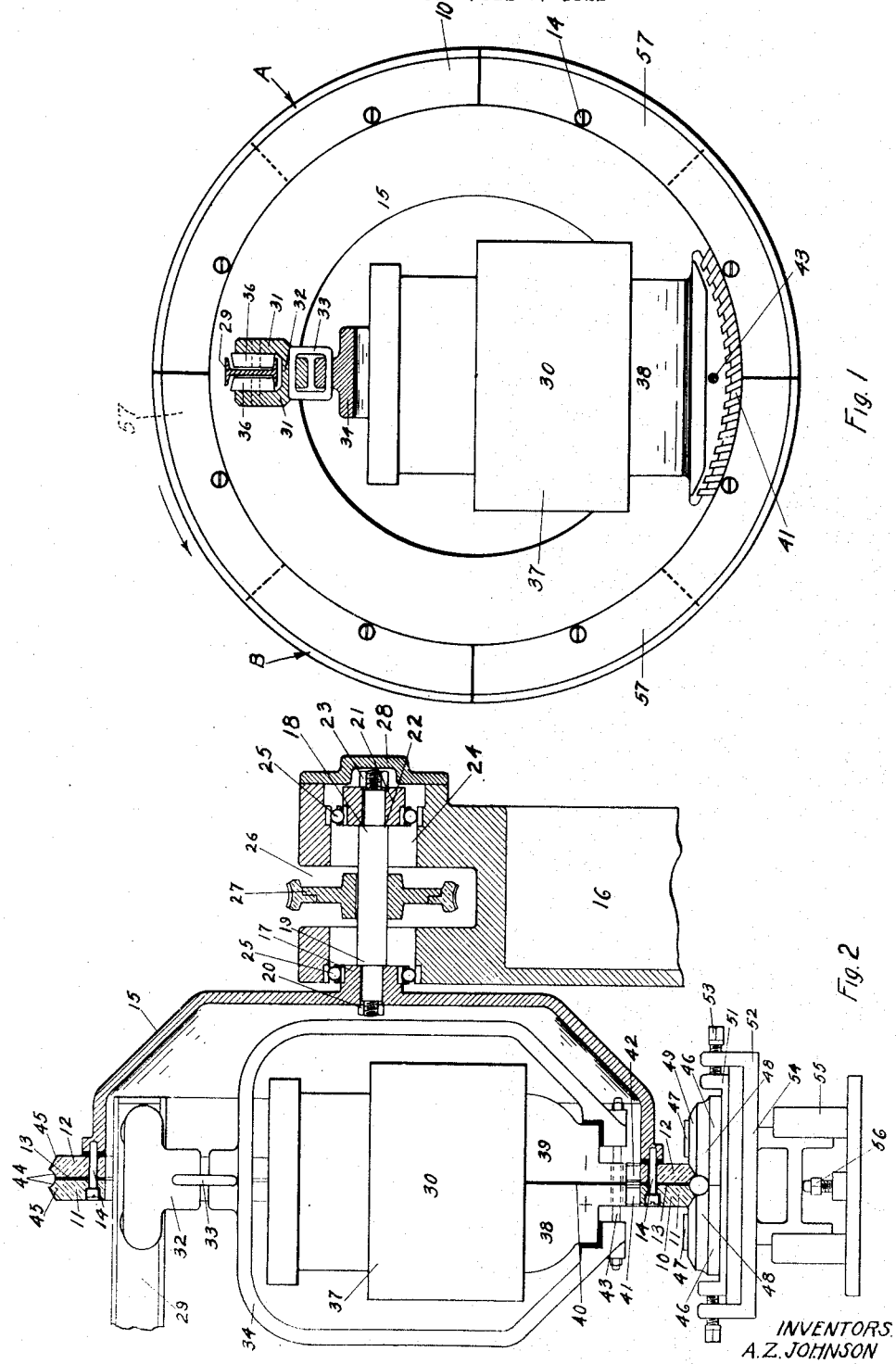
INVENTORS.
A.Z. JOHNSON
N.A. JOHNSON
By Their ATT'Y: Clarence S. Walker.

Patented Apr. 29, 1924.

1,492,173

UNITED STATES PATENT OFFICE.

AXEL Z. JOHNSON AND NELS A. JOHNSON, OF JAMESTOWN, NEW YORK.

APPARATUS FOR BUTT-WELDING TUBING.

Application filed April 6, 1922. Serial No. 550,131.

*To all whom it may concern:*

Be it known that we, AXEL Z. JOHNSON and NELS A. JOHNSON, citizens of the United States, residing at Jamestown, in the county of Chautauqua and State of New York, have invented certain new and useful Improvements in an Apparatus for Butt-Welding Tubing, of which the following is a specification.

This invention relates to an improvement in an apparatus for electrically butt welding tubing and more particularly to the electrode and the elements related thereto which form an essential part of such apparatus.

One of the chief objects of this invention is to provide an apparatus in which an annular roller electrode composed of two rings functioning as a unit is employed in conjunction with a stationary transformer mounted in the plane of such electrode with the secondary coils of the transformer in close proximity to the electrode. By virtue of this arrangement both the weight of the rotating electrode is reduced to a minimum in contradistinction to the construction disclosed in the patent to Fulda No. 1,199,537 in which the transformer rotates with and as a part of the electrode and also the distance traveled by the current from the transformer to the electrode is reduced to a minimum, a feature not present in other well known forms of welding apparatus having a roller electrode and a stationary transformer such as for example that embodied in the patent to Johnston No. 1,388,434.

Another object is the provision in such an apparatus of a roller electrode made up of two rings insulated from each other and each composed of a series of arcuate sections also insulated from each other, the sections in one ring being in staggered relation to those in the other.

A further object is the provision of a butt welding apparatus which can be quickly and easily adapted to operate upon tubing of any desired size by using a roller electrode and forming rolls of the proper dimensions and by adjusting the positions of the rolls and the transformer without disturbing in any way the operating mechanism.

An apparatus having the above objective features has obviously many advantages over the apparatus previously known in electrically butt welding tubing rapidly and economically and furthermore this apparatus has also other features which will appear from a consideration of the following description and of the drawing which forms a part thereof and in which—

Fig. 1 is a view showing in elevation a roller electrode in conjunction with a stationary transformer both embodying this invention; and Fig. 2 is a transverse section showing such electrode and transformer mounted in relation to other elements of a tube butt welding apparatus embodying this invention.

Referring to the drawings the reference numeral 10 is used to designate a roller electrode composed of two similarly formed rings 11 and 12 separated by insulation 13 and held together by bolts 14 so that they act in all cases as a unit. The rings 11 and 12 are each made up of a series of arcuate sections 57 insulated from each other.

The roller electrode 10 is mounted, preferably by the bolts 14 above referred to, upon a cup like frame 15 mounted to rotate upon a standard 16. At the center of the frame 15 is provided a boss 17 through which extend a shaft 18. That portion of the shaft within the boss 17 is reduced in diameter, thus providing a shoulder 19 bearing against the outer face of the boss and coacting with the nut 20 threaded onto the end of the shaft to secure the shaft in place. The shaft is keyed or otherwise formed to prevent any rotation of the frame 15 relative to the shaft.

A ring 21 similar in conformation to the boss 17 is keyed at the opposite end of the shaft and like the boss is clamped between a shoulder 22 and a nut 23. The upper part of the standard 16 is transversely bored at 24 to receive the boss 17 and ring 21 which are rotatably supported therein on suitable bearings 25. A slot 26 in the standard 16 admits a driving gear wheel 27 keyed on the shaft 18 between the boss 17 and ring 21. The outer end of the bore 24 is closed by a cap 28 to protect the bearings from dust and dirt. Thus by the application of power to the gear wheel 27 the frame 15 and electrode 10 are rotated.

Extending into the frame 15 from the open side is a track 29 which supports the transformer 30 in the plane of the roller electrode 10. Extending at either side of the track 29 are the arms 31 of a yoke 32 from which is suspended by a ring 33 a saddle 34 in which the transformer 30 is carried suitable insulation 35 being provided between the transformer and the saddle. As shown in Fig. 1 the track 29 is in the form of an I-beam and on the upper faces of its lower flange rest rollers 36 pivoted to the arms 31.

The transformer is of the well known shell type having a core 37 from which project the positive and negative secondary coils 38 and 39 separated by insulation 40 and having brushes 41, 42 which bear upon the inner faces of the electrode rings 11 and 12. A bolt 43 suitably insulated extends through the tips of the saddle 34 and the coils 38, 39 to hold the transformer securely in place.

The outer peripheries of the rings 11 and 12 have an irregular contour. The adjacent portions 44 are arcuate and together form a portion of the circumference of a circle having preferably a radius slightly less than that of the tube to be welded. The other portion 45 of each periphery is faced back for a reason which will be disclosed later.

It is, of course, understood that the tube to be welded is first formed by a series of rollers through which the material passes but since this invention relates simply to the electrode and transformer no showing of the means for performing the preliminary steps is here made. The tube already formed is fed below the electrode 10 and confined by the rolls 46 mounted to rotate about pins 47 at each side of the electrode. Rolls 46 may be made of some dielectric substance for reasons as explained below.

Each roll 46 includes a portion 48 having a periphery of arcuate contour of the same radius as the portions 44 of the electrode rings 11, 12 and a portion 49 faced back at an angle complementary to the angle of the portions 45 of the rings 11, 12. The portions 44 and 48 unite to form a circle completely enclosing the tube 50 to be welded. Since that circle has a radius slightly less than that of the tube the edges to be welded are forced together under pressure to insure a positive union when the welding takes place. At the same time the rings 11 and 12 being bolted together must function as a unit so that the pressure on the tube at each side of the welding line is uniform and consequently the completed tube is absolutely even.

The rolls 46 are mounted on a platform 51 mounted on the table 52 and transversely adjustable thereon by the screws 53. The table 52 is composed of two parts 54, 55 the part 54 being vertically adjustable on the part 55 by the threaded pin 56.

The apparatus shown and described is, of course, intended for use upon tubes of a certain diameter but by reason of the construction described above it can be adapted to work on tubes of any size desired. Thus the electrode rings 11, 12 and the rolls 46 may be easily removed and others of the proper size substituted, the platform 51 and table 52 are adjustable and the transformer is movable on the track 29 to the proper position relative to the electrode rings used.

Since the brushes 41, 42 directly connect the secondary coils 38, 39 with the electrode rings 11, 12 the path from the transformer to the tubing is very short and consequently the loss of current is at a minimum.

As shown in Fig. 1 the sections 57 of ring 11 are staggered with relation to the sections of the ring 12 and moreover each section is completely insulated. By reason of this construction the current in use is always confined to the lower half of the electrode rings, thus eliminating all chances of short circuiting the welding current along the upper half of the electrodes. In case of continued runs of tubing the overheating of the electrodes may be provided against by means of any suitable cooling agency applied to act on the electrodes at A. Moreover in order to bring the electrodes up to the desired temperature at the beginning of the operation so as to eliminate any possibility of the electrodes chilling the incipient weld, heat may be applied to them at B.

While only one embodiment of this invention has been shown and described applicant is not to be limited thereby since it is obvious that other embodiments may be made without departing from the spirit and scope of the invention as set forth in the following claims.

Having thus described our invention that which we claim as new and for which we desire protection of Letters Patent of the United States is the following:

1. In an apparatus for butt welding tubing an annular rotatable electrode and a stationary transformer mounted in the plane of said electrode.

2. In an apparatus for butt welding tubing, an annular rotatable electrode, a stationary transformer in the plane of said electrode, the positive and negative terminals of said transformer lying adjacent the inner face of said electrode and brushes carried by said terminals bearing against said inner face.

3. In an apparatus for butt welding tubing, an annular electrode, a frame on which said electrode is mounted, means for rotating said frame and said electrode, a stationary transformer supported in the plane of said electrode and brushes at the lower end of said transformer bearing upon the inner edge of said annular electrode.

4. In an apparatus for butt welding tubing the combination with an annular rotating electrode, of a support, a stationary transformer suspended from said support and adjustable thereupon into the plane of said electrode.

5. In an apparatus for butt welding tubing the combination with an annular rotating electrode, of a support, a yoke having arms extending at each side of said support, rollers pivoted on said arms and resting upon said support, a stationary transformer suspended from said yoke and adjustable through said rollers and support into the plane of said electrode.

6. In an apparatus for butt welding tubing, an annular electrode composed of a plurality of sections entirely insulated from each other.

7. In an apparatus for butt welding tubing, an annular electrode composed of two rings separated by insulation, each of said rings consisting of a series of insulated sections, the sections of one ring being staggered with relation to the sections of the other ring.

8. In an apparatus for butt welding tubing, an annular rotating electrode, a frame on which said electrode is removably mounted, a stationary transformer, a track by which said transformer is adjustably supported within the plane of said electrode, replaceable forming rolls below said electrode for confining the tubing to be welded and means for adjustably positioning said rolls whereby said apparatus may be adapted to operate upon tubing of any desired size by employing an electrode and forming rolls of the proper dimensions and by adjusting the positions of said rolls and said transformer.

In testimony whereof we affix our signatures.

AXEL Z. JOHNSON.
NELS A. JOHNSON.